Nov. 5, 1929.   H. M. SHIELDS   1,734,534
APPARATUS FOR RECOVERING THE VALUABLE CONSTITUENTS FROM CITRUS FRUITS
Filed Oct. 24, 1925   4 Sheets-Sheet 2
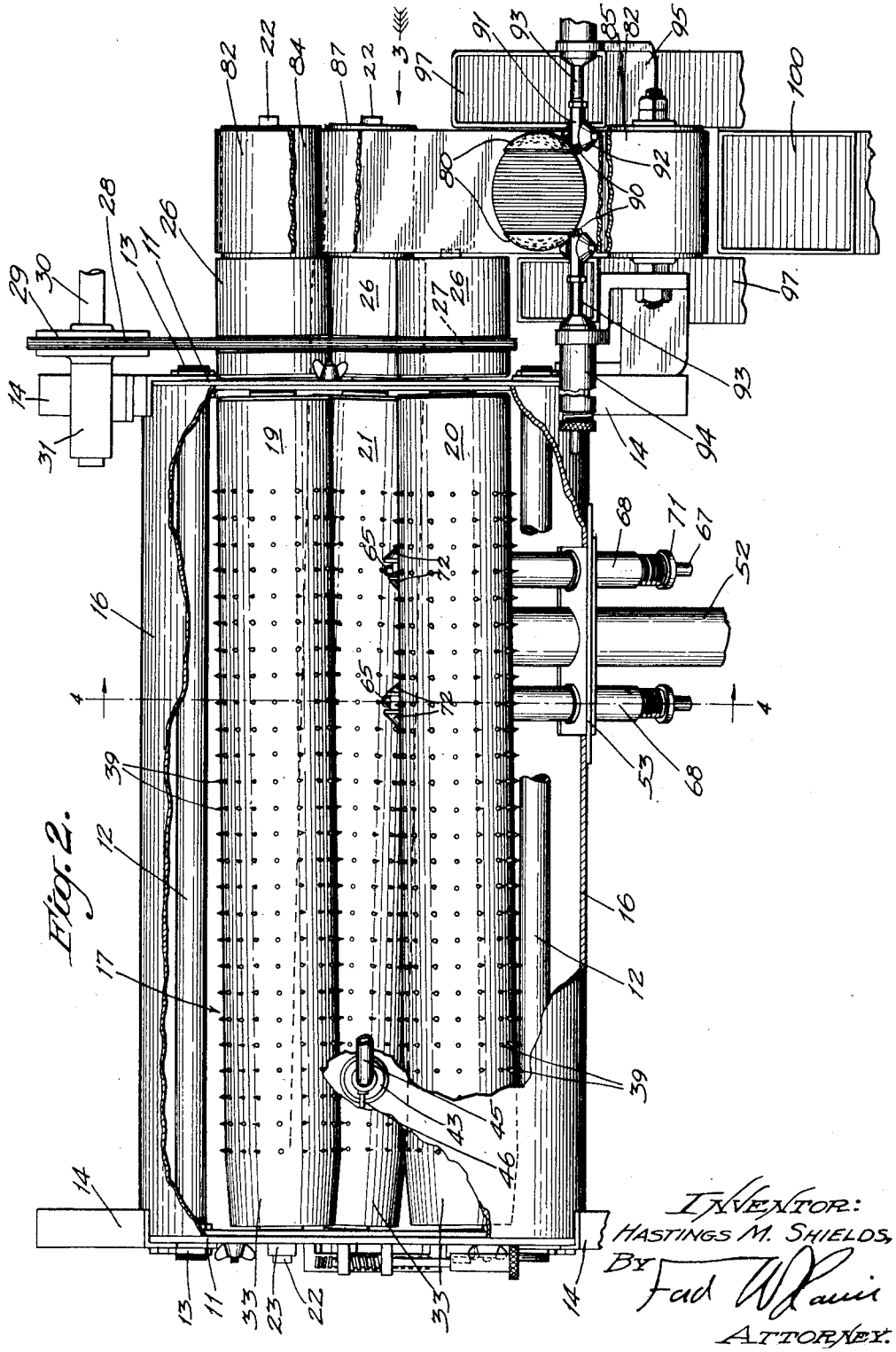

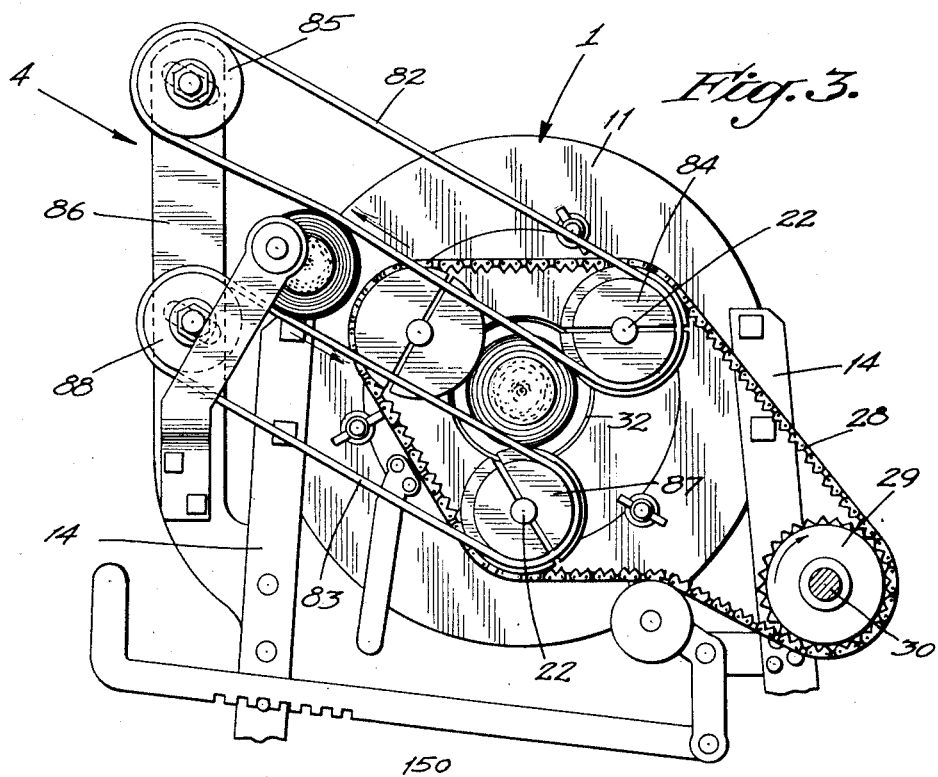
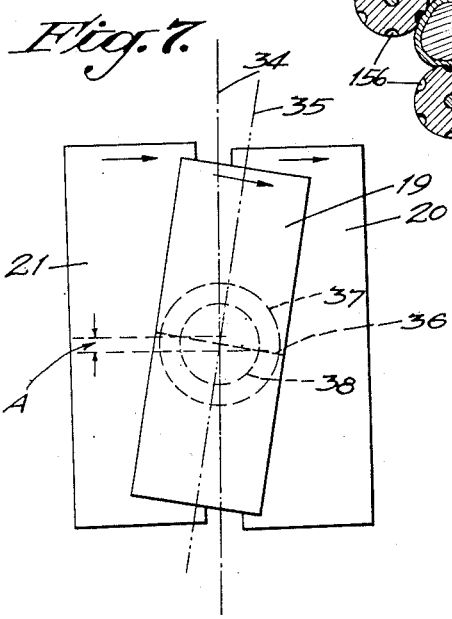
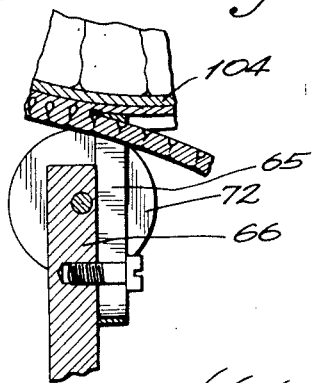

Nov. 5, 1929.  H. M. SHIELDS  1,734,534
APPARATUS FOR RECOVERING THE VALUABLE CONSTITUENTS FROM CITRUS FRUITS
Filed Oct. 24, 1925  4 Sheets-Sheet 4
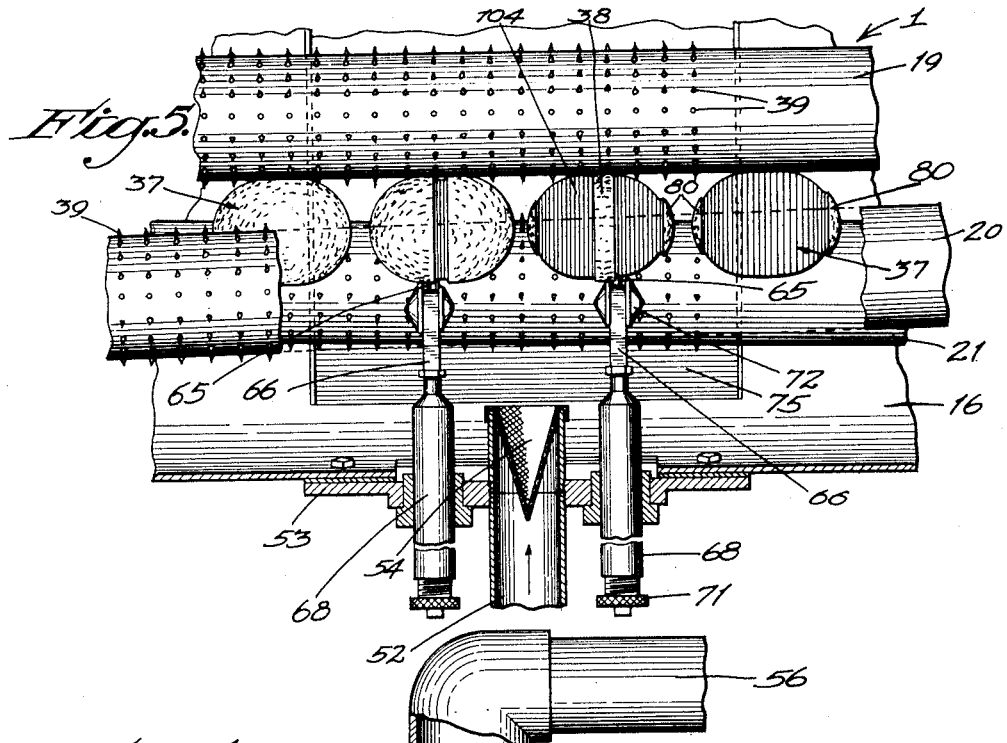
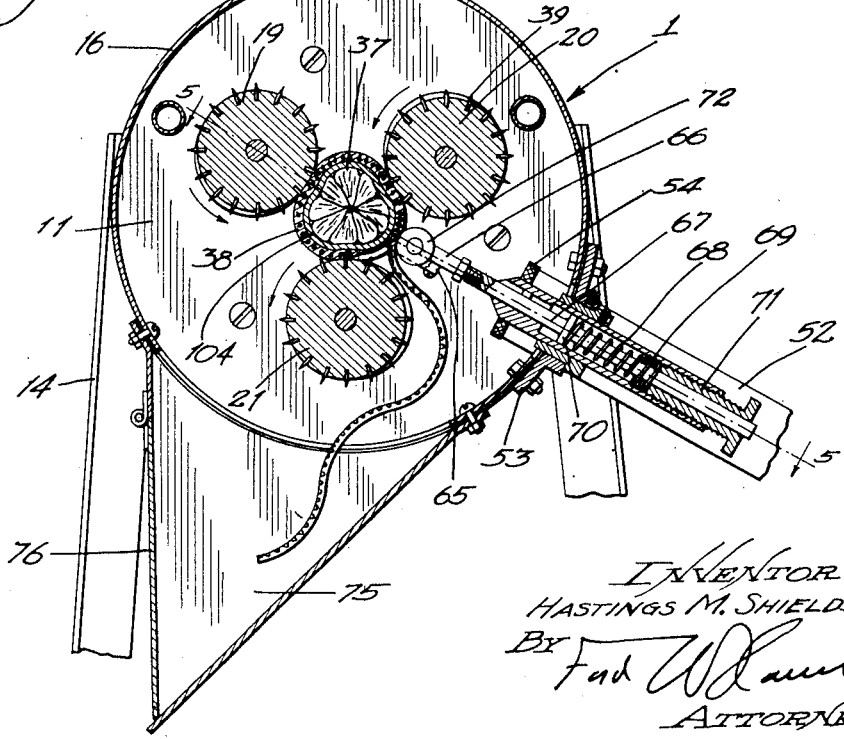
INVENTOR:
HASTINGS M. SHIELDS,
BY
ATTORNEY.

Patented Nov. 5, 1929

1,734,534

UNITED STATES PATENT OFFICE

HASTINGS M. SHIELDS, OF LOS ANGELES, CALIFORNIA

APPARATUS FOR RECOVERING THE VALUABLE CONSTITUENTS FROM CITRUS FRUITS

Application filed October 24, 1925. Serial No. 64,602.

My invention relates to an apparatus for recovering the valuable constituents from citrus fruits, and it relates particularly to a machine for recovering the rind oils from citrus fruits. This application is a continuation in part of my application entitled Method of and apparatus for peeling fruit, Serial No. 42,026, filed July 7, 1925. My invention in the ensuing specification will be described as used in connection with the separation of oranges into their component parts.

Oranges have constituent parts which are valuable if they are properly derived. The juice of the orange makes a delicious drink if it is free from the rind oils; the outer portion of the rind is valuable for marketing in the form of marmalade and candied rind; the volatile rind oils, in isolation, are valuable for making flavor extracts; and the secondary or inner rind, consisting of the white substance beneath the outer or colored rind, contains pectin which is useful in jellifying fruit juices. To my knowledge there is no apparatus which efficiently and entirely separates all of the valuable constituents of oranges and, therefore, considerable of these constituents is wasted.

It is an object of my invention to provide a method of separating the valuable constituents of oranges so that there will be practically no waste and so that these constituents may be profitably marketed.

It is an object of my invention to provide an apparatus for conducting this method.

In the process of recovering rind oils from citrus fruit, it is very desirable that the inner juice bearing structure is not ruptured, since, if the juice bearing structure is ruptured, the juice will mix with the oils. This is undesirable owing to the fact that it requires subsequent separation, and also the juice tends to detract from the quality of the oil. Furthermore, if any oil mixes with the juice, the flavor of the juice is detracted from.

It is accordingly an object of this invention to provide an apparatus for recovering oils from citrus fruits in which the juice bearing structure is not ruptured.

It is another object of this invention to provide an apparatus for recovering the more volatile oils from citrus fruit, which involves rotating a citrus fruit, penetrating the surface thereof, and immediately thereafter placing the inner portion of the penetrated area under compression and the outer portion of the penetrated area under tension. This apparatus is found to be efficient in removing a maximum of the volatile oils from the rind and also part of the heavier oils therefrom.

It is another object of this invention to provide an apparatus for recovering rind oils from citrus fruit having a plurality of rollers which carry penetrating points between which the citrus fruit is rotated and fed, the rind being penetrated in order to free the rind oils therefrom.

It is a still further object of this invention to provide an apparatus for recovering rind oils from citrus fruit in which the oils are thrown from the fruit by centrifugal force.

It is a still further object of this invention to provide an apparatus for recovering rind oils from citrus fruit which consists in cutting through the oil sacs of the rind.

It is a still further object of my invention to provide an apparatus for recovering rind oils from citrus fruit, having means for rotating citrus fruit and means for cutting the fruit through the oil sacs of the rind while it is in rotation.

It is a still further object of this invention to provide a process of the character mentioned which involves washing the rind of the fruit while it is in rotation.

It is an additional object of this invention to provide an apparatus for recovering rind oils from citrus fruit which involves releasing the volatile oils in a gas circuit by means of which the oils are conveyed to a condenser It is also an object of this invention to provide an apparatus in which the conveying gas of the gas circuit is heated.

Another object of my invention is to provide a gas circuit for capturing and condensing volatile oils released by the opening of oil sacs in the rind of citrus fruit, which circuit includes a substantially confined space in which the oils are released and conduits leading from this space to a blower and returning from the blower to the space, a condenser being located in the outgoing conduit and a heater in the return conduit. In this gas circuit the heater heats the air entering the space in which the volatile oils are released so that the gas will more readily absorb the volatile oils. Having absorbed the oils, the gas is drawn through the outgoing conduit to the condenser which removes most of the oil. Any uncondensed oil vapor leaving the condenser in the conveyor, however, is not lost but is continued in the circuit and condensed later.

It is another object of this invention to remove a portion of the rind of a citrus fruit, bearing rind oil and express the oil therefrom.

Other objects and advantages of this invention will be made evident hereinafter.

Referring to the drawings in which I illustrate a preferred form of my invention, Fig. 1 is a diagrammatic view illustrating the complete apparatus of my invention.

Fig. 2 is a plan view of an oil recovering machine of my invention, this view being partially sectioned to show the interior construction thereof.

Fig. 3 is an end view of the machine shown in Fig. 2, this view being taken substantially as indicated by the arrow 3 of Fig. 2.

Fig. 4 is a cross section of the machine shown in Fig. 2 and is taken substantially as indicated by the line 4—4 of Fig. 2.

Fig. 5 is a fragmentary plan view of the oil recovering machine of my invention viewed in the direction indicated by the arrows 5—5 of Fig. 4, one of the rollers being broken away and certain of the parts being in section.

Fig. 6 is an enlarged fragmentary detail showing clearly the manner in which knives of the oil recovering machine of my invention sever oil sacs of the rind of a citrus fruit in order to free the rind oils therefrom.

Fig. 7 is a very diagrammatic view illustrating the principle by which the citrus fruit is fed through the oil recovering machine of my invention.

Fig. 8 shows a modified form of my invention.

Figure 1:
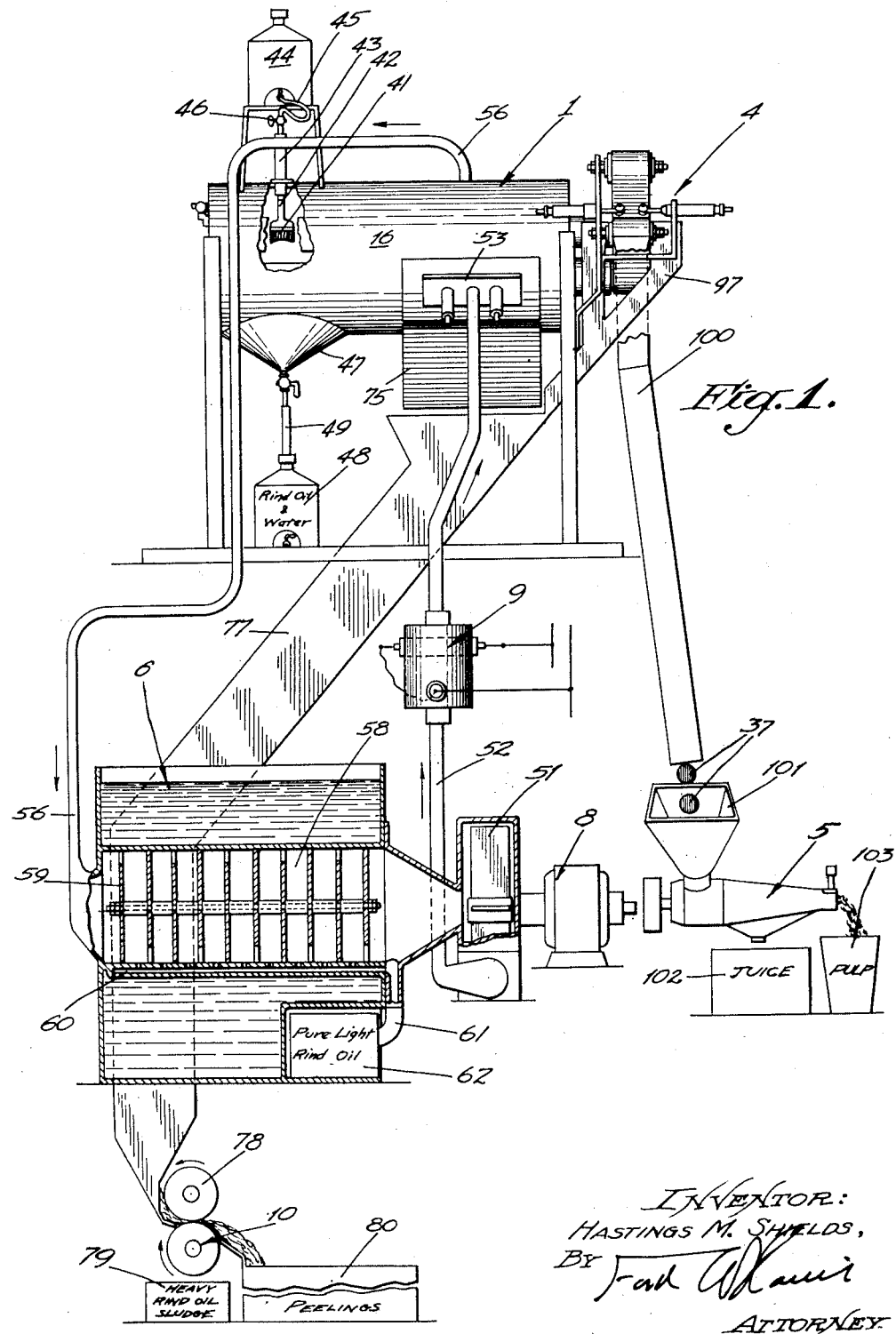

With reference to Fig. 1 of the drawing the apparatus of my invention consists of an oil recovering machine 1, an end button remover 4, a juice extractor 5, an oil vapor condenser 6, a blower fan 51, a heater 9 and a pressure oil extractor 10.

With reference to Figs. 2 to 7 inclusive the oil recovering machine of my invention will be described in detail. Referring particularly to Fig. 2, the machine 1 has end plates 11 which are secured together by spacer bars 12 attached to the end plates 11 by nuts 13. The end plates 11, as shown clearly in Figs. 1 and 4, are supported by legs 14 which are secured thereto. Extending between and secured to the end plates 11 is a housing 16 which provides a confined space 17 therewithin and between the end plates 11.

Situated in the confined space 17 is a plurality of rollers 19, 20 and 21. These rollers are provided with trunnions 22 by which they are rotatably supported in bearings 23, which bearings 23 are supported by the end plates 11. The trunnions 22 at one end of the rollers are extended outwardly from the adjacent end plate 11 and have roller extensions 26 secured thereto. The extensions 26 are divided into two parts between which sprockets 27 are provided, these sprockets being adapted to be engaged by a chain 28 by means of which the rollers 19, 20 and 21 are driven. The chain 28 extends over a drive sprocket 29, the shaft 30 of which is supported by a bearing 31 secured to one of the legs 14. This is clearly shown in Figs. 2 and 3.

The end plates 11 have openings 32 formed therein which communicate with a space or path which is formed by the rollers 19, 20 and 21. Citrus fruits, being oranges in this application, are adapted to be inserted into this space through the left end of the machine, and are rotated by the rollers and fed thereby along the path formed by the rollers, being expelled through the right end of the machine. The rollers 19, 20 and 21 are tapered at the left end as indicated at 33 so that the oranges may be readily inserted between the rollers, the oranges being gradually placed under pressure.

The rollers 19, 20 and 21 are arranged in a particular manner so that they inherently feed the orange along the path formed thereby. The rollers are positioned so that their axes do not extend parallel with the axis of the path but are twisted in the same direction from parallelism with the axis of this path. Referring to Fig. 7, I diagrammatically illustrate the principle of operation of these rollers. 34 represents the axis of the path formed by the rollers 19, 20 and 21, and 35 represents the axis of the roller 19. This axis 35 is at an angle with the axis 34 as clearly shown in Fig. 7. The travel of a single point on the roller 19 is indicated by the dotted line 36, this path 36 being in a plane at right angles to the axis 35 of the roller 19. The dotted line 37 indicates the outline of an orange, and the dotted line 38ª represents the area of contact which the orange has with the roller 19. A point of the orange is, therefore, engaged where the path 36 intersects the dotted line 38ª at the right side thereof. The point of the orange is carried with the point of the roller along the path 36 until it reaches the opposite side of the circle 38ª where the point of the orange and the point of the roller are disengaged. It will be seen that the point of the orange, in its travel in contact with the point of the roller 19, is carried forward along the axis 34 a distance represented at A in Fig. 7.

From this description and inspection of Fig. 7 it is quite evident that the rollers 19, 20 and 21 rotate an orange and also feed it from the left end of the machine 1 to the right end thereof.

Referring now to Fig. 4 the adjacent faces of the rollers 19, 20 and 21 define a circle which is of smaller diameter than the diameters of the oranges which are fed therethrough. Therefore, the oranges will have the shape as shown by the orange 37 in Fig. 4. It will be seen that the portions of the oranges 37 which are engaged by the rollers 19, 20 and 21 are compressed and the portions of the orange between these rollers are bulged outward. The bulging of the orange, as shown, places the outer part of a rind 38 of the orange under tension and places the inner portion of the rind 38 under compression.

The rollers 19, 20 and 21 are each provided with a multiplicity of penetrator points 39 which project outwardly a short distance from the peripheries of the rollers and extend radially therefrom. As shown clearly in Fig. 4 these penetrator points 39 penetrate the rind 38 of the orange. It is a well known fact that the rind of an orange contains considerable oils which are carried in small oil sacs in the rind. In penetrating the rind 38 the oil sacs thereof are punctured, and the oil will tend to exude therefrom. An orange in its passage through the machine is penetrated thousands of times by the penetrators 39 and consequently practically all of the oil sacs in the rind 38 are punctured. By bulging the orange, as shown in Fig. 4, it is possible to effectively expel the oils from the rind. By placing a tension, as described, on the outer portion of the rind, the openings formed by penetration are distended, and by placing a compression on the inner portion of the rind, the oils are forced from the rind through these openings. Considerable of this oil is in the form of a vapor, whereas other of the oil is in the form of a liquid, this liquid tending to remain on the outer face of the rind 38. However, the fact is that the orange is being rotated at a rate of speed sufficiently high to create a centrifugal force which is great enough to throw the liquid oils from the orange in the form of minute particles which are held in suspension in the space 17.

As shown in Fig. 1, I provide a brush 41 which extends into the path formed by the rollers 19, 20 and 21, and which is adapted to engage oranges as they pass therethrough in order to wash or scrub the rinds 38 thereof. The brush 41 is preferably supported on an arm 42 which is resiliently held in a body 43, which body is supported by the housing 16 of the machine 1. The brush thereof tends to follow the contour of an orange as it moves thereby. A water tank 44 is supported above the body 43 and is connected therewith by means of a hose 45 having a valve 46. Water is carried in the tank 44 which is fed through the hose 45 and the body 43 to the brush 41, this water and the brush cooperating to wash the oranges as they pass thereby. The housing 16 is provided with a funnel portion 47 directly below the brush 41 in which the water, by which the oranges are washed, is received. A tank 48 is placed below the portion 47 and is connected therewith through a hose 49, being adapted to receive the water from the portion 47. Since the oranges are penetrated at the point of washing, the water will contain rind oils and it is therefore desirable to save the washing water in the tank 48 so that the oil may subsequently be separated from the water and dirt.

The rind oils are released in the confined space 17 in the form of vapors and oil particles, and to carry these rind oils from this space I employ a hot gas circuit, which may be air, which connects to the confined space and carries the rind oils therewith to the condenser 6. As shown in Fig. 1 the blower fan 51 is driven by a motor 8 and draws air from the condenser 6 and forces it through a conduit 52 having the heater 9 situated therein. The air passes through the heater 9 and is raised to a suitable temperature. The conduit 52 is connected to a plate 53 and is communicated thereby with the confined space 17. A screen 54 is placed in the end of the conduit 52 in the confined space 17 (Fig. 5). This hot air absorbs the oil vapors and particles, and part of the lighter oil particles are actively vaporized by the hot air being absorbed thereby and carried therewith from the confined space 17 through a conduit 56 to the condenser 6. The air carrying the oil vapors and particles is passed into a condensing chamber 58 of the condenser 6, where it is cooled and the oils are condensed and collected therefrom. This condensing chamber 58 is provided with a series of baffles 59 which provide a tortuous path for the gas. The rind oils collect in a passage 60 formed below the chamber 58 and are conducted through a pipe 61 to a light rind oil storage 62. The air is drawn to the blower by the action of the fan 51. From this it will be seen that the air is passed continuously through a closed circuit. If all of the rind oils are not condensed from the air in its passage through the condenser 6, they will not be lost but may be recovered therefrom at a later time. The oils which are recovered from the air circuit are of a very volatile nature and of a very high grade of oil which is useful for making flavor extracts.

The innermost sacs of the rind 38 are not all penetrated by the penetrators 39, and I therefore provide knives 65 which sever the innermost sacs of the rind and remove the rind from the orange in the form of long strips or strings of peel.

Any of the heavier rind oils released in the confined space 17, which are not carried away through the gas circuit, collect in the bottom of the shell 16 in the form of a sludge and drain therefrom into the tank 48. As shown best in Figs. 2, 4, 5 and 6 the knives 65 are secured to heads 66 which are secured to plungers 67. The plungers 67 are held by bodies 68, these bodies 68 being secured in a suitable manner to the plate 53. The bodies 68 have chambers in which springs 69 are situated. These springs 69 are compressed between flanges 70 of the plungers 67 and inner faces of bushings 71 which are secured in the outer ends of the bodies 68. The action of the springs 69 tends to hold the plungers inwardly and the knives 65 in the path provided by the rollers 19, 20 and 21. Guide rollers 72 are rotatably secured to the heads 66 adjacent to the knives 65 for guiding them over the contour of the oranges as they pass thereby.

The knives operate as clearly shown in Fig. 5. As an orange passes by the knives, they are generally forced thereby from an innermost position into a retracted position. The rollers 72 prevent the knives 65 from gouging into the orange and cause the knives to cut at a certain depth so that they will only remove the rind from the orange. One of the knives 65 is adapted to remove the rind from the forward portion of an orange, whereas the other knife is arranged to remove the rind of the rear portion of an orange. Referring particularly to Fig. 5, it will be noted that the rollers 72 of the two knives 65 are of such a size that the right-hand knife 65 removes the rind from the forward part of the orange and rides over the rear part thereof, whereas the lefthand knife 65 rides over the forward part of the orange but removes the rind from the rear part thereof. As illustrated in Fig. 6 the knife severs the rind 37 at the innermost part thereof and severs the innermost oil sacs of the rind which carry rind oil. In this manner the oil sacs which are not penetrated by the penetrators 39 are severed by the knives 65 and therefore a maximum amount of rind oil is removed.

The strips of peel which are removed from the oranges by the knives 65 fall, as shown in Fig. 4, into a bin 75 formed by the housing 16 below these knives. The bin 75 is closed by a door 76 which may be opened by the peel which collects in the bottom of the bin. The peel passes from the bin 75 into a chute 77 by means of which it is conveyed to the pressure oil extractor 10. This extractor 10 may consist of a pair of rollers 78 through which the peel passes and has the remaining oil presurably extracted therefrom. The oil which is removed from the peel by the extractor 10 is a heavy rind oil sludge which is deposited in a container 79. This sludge is subsequently separated so that the oil is derived therefrom. The peel is deposited in a bin 80. It is sometimes desirable to eliminate the extraction of the oil from the peel and to use the peel for the purpose of marmalades and candied fruits. It should be clearly understood that the peel which is removed from the oranges has not come in contact with the juice bearing structure or any juice whatsoever. Orange peel which has come in contact with juice of the orange is difficult to preserve for a long period of time, but becomes rancid. For the reason that the peel removed by my invention does not come in contact with the juice, it may be preserved in salt brine or any other suitable preservative for long periods of time without danger of rancidity. The importance of this feature of my invention should not be passed over superficially, since it permits the producing of an oil and a rind which will remain wholesome so that they can be transported to localities of use. In the past, orange peel has been difficult to market, since it becomes rancid after a period of time even though it is kept in a preservative.

The oranges as they pass through the machine 1 have the rind oils removed therefrom and practically all of the peel cut therefrom with the exception of end buttons 80 thereof. The oranges 37 pass from the right end of the machine 1 and are directed by the extensions 26 into the end button remover 4.

The end button remover 4 consists of upper and lower belts 82 and 83 (see Fig. 3). The belt 82 extends over a drive pulley 84 which as shown, is secured to the end of one of the trunnions 22 and extends over an idler pulley 85 which is supported on an arm 86, this arm 86 being secured to one of the legs 14 of the machine 1. The lower belt 83 extends over a drive pulley 87 which is secured to one of the trunnions 22 and over an idler pulley 88 which is supported by the arm 86. The belts 82 and 83 are arranged as shown clearly in Fig. 3 so that there is a space therebetween which is adapted to receive the oranges 37 as they are ejected from the oil recovering machine 1. The pulleys 84 and 85 are of larger diameter than the pulleys 87 and 88. Therefore, the upper belt 82 is traveling at a higher rate of speed than the lower belt 83 and the adjacent sides of the two belts travel in opposite directions. The oranges are fed by the extensions 26 between the belts 82 and 83, which belts engage the oranges and rotate them at high rates of speed. Since the upper belt is traveling faster than the lower belt, there is a tendency for the orange to be moved towards the left end of the belts.

As shown best in Fig. 2, end button removing knives 90 are extended into the path of the oranges between the belts 82 and 83.

These knives 90 are of substantially the same character and are supported in substantially the same manner as the knives 65. They are secured to heads 91 which have guide rollers 92. The heads 91 are secured to plungers 93 which are supported by bodies 94, these bodies 94 being supported by suitable brackets 95. I have found by experience that the end buttons 80 which are left at each end of the oranges tend to keep the oranges in proper positions between the belts 82 and 83, and they will therefore be fed towards the left end of the belts in proper positions. The end remover knives 90 are engaged by the orange and follow the contour of the end buttons thereof, removing these end buttons in the form of strips of peel which fall through an upper extension 97 of the chute 77, being directed to the pressure oil extractor 10 thereby.

The oranges at this time are completely peeled and are dropped into a chute 100 by means of which they are conveyed to a juice extractor 5 in which the juice thereof is extracted from the pulp of the orange. This extractor 5 may be of any suitable character having a hopper 101 into which the oranges 37 are directed by the chute 100. The juice is deposited in a container 102 and the pulp is deposited in a container 103. The pulp consists of the juice bearing structure of the orange and the pectin bearing material of the orange, this pectin bearing material being the white layer which is situated immediately beneath the rind 38 of the orange. The pectin bearing material is indicated at 104 in Figs. 4 and 6. The pectin may be readily derived from the pectin bearing material which constitutes a part of the pulp.

Capitulating the foregoing description 1 provide an apparatus which separates an orange into its constituent parts in an economical manner. The rind oils, the peel, the juice and the pectin bearing material are all substantially separated and may be separately marketed.

An important phase of my invention is the mode of recovering the rind oils. I have had great success in this phase principally because the rind of the orange is first compressed and penetrated and then placed under compression and tension, as previously described, to free said rind oils. The centrifugal force throws these oils from the orange and the heated gas effectively recovers the freed oils. The knives in cutting the inner oil sacs of the rind free the oils which are missed by the penetrating points.

Probably an equally important consideration of my invention is the fact that the inner juice bearing structure is not penetrated by an apparatus of my invention. As pointed out before, this is extremely important, since the presence of juice in the oil requires a subsequent separation and its presence detracts from the quality of the oil. It is quite obvious from the description and the drawings that the juice bearing structure of an orange is not at all penetrated by the apparatus of my invention, and therefore it is impossible for any juice to commingle with the rind oils. The oranges, as they are supplied to the juice extractor 5, have an unbroken covering of pectin bearing material around the juice bearing structure.

Broadly stated, my invention consists in releasing rind oils from the rind of a citrus fruit in a confined space which is included in a circuit of gas, by means of which gas the oil is carried to suitable condensing means. As previously stated, a very important factor of my invention is the simultaneous rotating and feeding of a citrus fruit along a given path and releasing the rind oils from the rind of the fruit. It should be understood that certain changes might be made in this part of my invention. For example, in Fig. 8 I show a modification of my invention having rollers 150, 151 and 152 which are adapted to feed a citrus fruit 153 between these rollers and to rotate this fruit at the same time. In Fig. 8 the means for releasing the rind oils is shown in the form of longitudinal depressions or grooves 156. As the rollers 150 to 152 revolve, the depressions 156 come into adjacency with the surface of the fruit 153 and create a local relief of pressure, the skin of the fruit being forced into the adjacent depression by an opposite roller. These depressions may be straight or spiral or may vary in depth along the rollers. A still further type of oil releasing means would be protrusion formed on the roller which would engage the fruit. This action is effective in forcing the rind oils from the rind of the orange.

It should be clearly understood that the apparatus shown in the drawings is only one form by which my process may be carried out, and that other apparatus could be devised for conducting my process. My invention is described for use with oranges, but may be used in connection with other fruits, such as lemons. I, therefore, desire my invention to be construed solely by the appended claims.

I claim as my invention:

1. An apparatus for recovering oil from citrus fruits comprising: a plurality of rollers normally spaced apart and arranged to define a space therebetween, said rollers being not all in the same plane, and having their respective axes slightly out of parallelism with each other and with the axis of the path represented by the space defined between the rollers, so that upon rotating the rollers at the same speed in the same direction a citrus fruit will be pressed therebetween, and will be fed along the axis of the path between the rollers; and means carried by the rollers for opening the oil sacs of the fruit so as to free the oil therefrom.

2. An apparatus of the nature disclosed, comprising: a plurality of longitudinally arranged rollers placed in substantially circular relativley spaced arrangement to define an intermediate longitudinal space for the passage of a citrus fruit, at least one of said rollers being deviated from parallelism relative to the other rollers and relative to the axis of said space, so that upon rotating said rollers at the same speed in the same direction the citrus fruit will be fed longitudinally of said rollers through said space; and automatically functioning cutting means for opening the rind sacs of said citrus fruit as it is passed through said space between said rollers so as to free the rind oils therefrom.

3. An apparatus of the nature disclosed, comprising: a plurality of longitudinally arranged rollers placed in substantially circular relatively spaced arrangement to define an intermediate longitudinal space for the passage of a citrus fruit, at least one of said rollers being deviated from parallelism relative to the other rollers and relative to the axis of said space, so that upon rotating said rollers at the same speed in the same direction the citrus fruit will be fed longitudinally of said rollers through said space; and means carried by said rollers for opening the rind sacs of said citrus fruit as it is passed through said space between said rollers so as to free the rind oils therefrom.

4. An apparatus of the nature disclosed, comprising: a plurality of longitudinally arranged rollers placed in substantially circular relatively spaced arrangement to define an intermediate longitudinal space for the passage of a citrus fruit, at least one of said rollers being deviated from parallelism relative to the other rollers and relative to the axis of said space, so that upon rotating said rollers at the same speed in the same direction the citrus fruit will be fed longitudinally of said rollers through said space; and penetrators carried by said rollers for opening the rind sacs of said citrus fruit as it is passed through said space between said rollers so as to free the rind oils therefrom.

5. An apparatus of the nature disclosed, comprising: a plurality of longitudinally arranged rollers placed in substantially circular relatively spaced arrangement to define an intermediate longitudinal space for the passage of a citrus fruit, said rollers being deviated from parallelism relative to each other and relative to the axis of said intermediate space, so that upon rotating said rollers at the same speed in the same direction the citrus fruit will be fed longitudinally of said rollers through said space; and automatically functioning cutting means for opening the rind sacs of said citrus fruit as it is passed through said space between said rollers so as to free the rind oils therefrom.

6. A combination as defined in claim 2 in which the inlet ends of said rollers are tapered to facilitate entrance of the fruit into said intermediate space.

7. An apparatus of the nature disclosed, comprising: a plurality of longitudinally arranged rollers placed in substantially circular relatively spaced arrangement to define an intermediate longitudinal space for the passage of a citrus fruit, at least one of said rollers being slightly out of parallelism with the other rollers and with the axis of said longitudinal space, so that upon rotating said rollers at the same speed in the same direction the citrus fruit will be fed longitudinally of said rollers through said space and simultaneously pressed between said rollers; and a knife controlled by said fruit and functioning to open the oil sacs of said citrus fruit as it is passed between said rollers so as to free the rind oils therefrom.

8. An apparatus of the nature disclosed, comprising: a plurality of longitudinally arranged rollers placed in substantially circular relatively spaced arrangement to define an intermediate longitudinal space for the passage of a citrus fruit, said rollers being deviated from parallelism relative to each other and relative to the axis of said intermediate space, so that upon rotating said rollers at the same speed in the same direction the citrus fruit will be fed longitudinally of said rollers through said space; and a knife controlled by said fruit and functioning to open the oil sacs of said citrus fruit as it is passed between said rollers so as to free the rind oils therefrom.

9. A combination as defined in claim 2 in combination with means contacting the fruit for washing and scrubbing said fruit as it passes through said intermediate space.

10. A combination as defined in claim 3 in combination with means contacting the fruit for washing and scrubbing said fruit as it passes through said intermediate space.

11. A combination as defined in claim 4 in combination with means contacting the fruit for washing and scrubbing said fruit as it passes through said intermediate space.

12. A combination as defined in claim 7 in combination with means contacting the fruit for washing and scrubbing said fruit as it passes through said intermediate space.

13. A combination as defined in claim 2 in combination with means associated with the oil sac opening means for capturing the volatile rind oils as they are released from said fruit; and means associated with said capturing means for condensing the captured rind oils.

14. A combination as defined in claim 3 in combination with means associated with the oil sac opening means for capturing the volatile rind oils as they are released from said fruit; and means associated with said capturing means for condensing the captured rind oils.

15. A combination as defined in claim 4 in combination with means associated with the oil sac opening means for capturing the volatile rind oils as they are released from said fruit; and means associated with said capturing means for condensing the captured rind oils.

16. A combination as defined in claim 7 in combination with means associated with said knife for capturing the volatile rind oils as they are released from said fruit; and means associated with said capturing means for condensing the captured rind oils.

17. A combination as defined in claim 2 in combination with means contacting the fruit for washing and scrubbing said fruit as it passes through said intermediate space; means associated with the oil sac opening means for capturing the volatile rind oils as they are released from said fruit; and means associated with said capturing means for condensing the captured rind oils.

18. A combination as defined in claim 3 in combination with means contacting the fruit for washing and scrubbing said fruit as it passes through said intermediate space; means associated with the oil sac opening means for capturing the volatile rind oils as they are released from said fruit; and means associated with said capturing means for condensing the captured rind oils.

19. A combination as defined in claim 4 in combination with means contacting the fruit for washing and scrubbing said fruit as it passes through said intermediate space; means associated with the oil sac opening means for capturing the volatile rind oils as they are released from said fruit; and means associated with said capturing means for condensing the captured rind oils.

20. A combination as defined in claim 7 in combination with means contacting the fruit for washing and scrubbing said fruit as it passes through said intermediate space; means associated with said knife for capturing the volatile rind oils as they are released from said fruit; and means associated with said capturing means for condensing the captured rind oils.

21. In an apparatus of the nature disclosed, the combination of: non-yielding compressing and conveying means for rotating and feeding a citrus fruit along a given path by contact with the surface of said fruit, said fruit being fed in a direction of the length of said conveying means and relative to said means; paring means for opening the oil sacs and for removing a portion of the rind of said fruit as it is fed by said conveying means; and means associated with said paring means for capturing the rind oils as they are released during the paring operation.

22. In an apparatus of the nature disclosed, the combination of: conveyor means for rotating and feeding a citrus fruit along a given path by contact with the surface of said fruit; paring means for opening the oil sacs of and for removing a central portion of the rind of said fruit as it is fed by said conveyor means; means for removing the end portions of the rind as the fruit leaves said paring means; means associated with said paring means for capturing the rind oils as they are released during the paring operation; and means for receiving the rind as it is removed from the fruit and for expressing rind oil from said rind.

23. In an apparatus of the nature disclosed, the combination of: a plurality of non-yielding compressing and conveying means for rotating and feeding a citrus fruit along a given path and for producing a bulge of the fruit between said means; paring means acting upon said bulged portion of the fruit for opening the oil sacs of and for removing a portion of the rind of said fruit as it is fed by said conveying means; and means associated with said paring means for capturing the rind oils as they are released during the paring operation.

24. In an apparatus of the nature disclosed, the combination of: conveyor means for rotating and feeding a citrus fruit along a given path; paring means for opening the oil sacs of and for removing a central portion of the rind of said fruit as it is fed by said conveyor means; a second conveyor means adapted to receive the fruit from said first-named conveyor means and functioning independently thereof to rotate and feed said fruit; means for removing the end portions of the rind as the fruit is rotated by said second conveyor means; means associated with the paring means for capturing the rind oils as they are released during the paring operation; and means for receiving the rind as it is removed from the fruit and for expressing rind oil from said rind.

25. In an apparatus of the nature disclosed, the combination of: a plurality of non-yielding compressing rollers placed in substantially circular arrangement; means for rotating said rollers in order to cause said rollers to compress, rotate, and feed a citrus fruit therebetween and to produce a bulge of said fruit between said rollers; paring means acting upon said bulged portion of the fruit for opening the oil sacs of and for removing a portion of the rind of said fruit as it is fed between said compressing rollers; and means associated with said paring means for capturing the rind oils as they are released during the paring operation.

26. A combination as defined in claim 25 in which the rollers are diviated from parallelism with the path of said fruit.

27. A combination as defined in claim 22 in which the paring means comprises a knife disposed in the path of said fruit.

28. A combination as defined in claim 22 in which the paring means comprises a plurality of knives, each adapted to remove a different portion of the rind of said fruit.

29. A combination as defined in claim 22 in which the paring means comprises a knife disposed in the path of said fruit and means for contacting the fruit to cause the knife to follow the contour of said fruit.

30. In an apparatus of the nature disclosed, the combination of: a plurality of compressing rollers placed in substantially circular arrangement; means for rotating said rollers to compress, rotate and feed a citrus fruit therebetween and to produce a bulge of said fruit between said rollers; means carried by said rollers for opening the outer oil sacs of the rind of said fruit; paring means acting upon said bulged portion of the fruit for opening the inner oil sacs of the rind and for removing a portion of the rind as said fruit is fed between said compressing rollers; and means associated with said rollers and paring means for capturing the rind oils as they are released from said oil sacs.

31. In an apparatus of the nature disclosed, the combination of: a plurality of rollers placed in substantially circular arrangement; means for rotating said rollers to cause said rollers to rotate and feed a citrus fruit therebetween; paring means for opening the oil sacs of and for removing a central portion of the rind of said fruit as it is fed between said rollers; means for removing the end portions of the rind as the fruit leaves the rollers; means associated with the paring means for capturing the rind oils as they are released during the paring operation; and means for receiving the rind as it is removed from the fruit and for expressing rind oil from said rind.

32. In an apparatus of the nature disclosed, the combination of: a plurality of rollers placed in substantially circular arrangement; means for rotating said rollers to cause said rollers to rotate and feed a citrus fruit therebetween; paring means for opening the oil sacs of and for removing a central portion of the rind of said fruit as it is fed between said rollers; means associated with said paring means for capturing the rind oils as they are released during the paring operation; a conveying arrangement placed at the exhaust end of said rollers and adapted to convey the fruit from said rollers; means associated with said conveying arrangement for removing the end portions of the rind from said fruit as it is carried by said conveying arrangement; and means for receiving the rind as it is removed from the fruit and for expressing rind oil from said rind.

33. A combination as defined in claim 32 in which said rind end removing means comprises two knives, each acting upon a respective end of said fruit.

34. An apparatus as defined in claim 1, in combination with: means forming a closed air conveying circuit including said capturing means; means for circulating air in said circuit; means for heating said air to increase the volatility of the rind oils captured by said capturing means; and a condensing means in said air circuit means for condensing the captured rind oil vapors.

35. An apparatus as defined in claim 21, in combination with: means forming a closed air conveying circuit including said capturing means; means for circulating air in said circuit; means for heating said air to increase the volatility of the rind oils captured by said capturing means; and a condensing means in said air circuit means for condensing the captured rind oil vapors.

36. An apparatus as defined in claim 30, in combination with: means forming a closed air conveying circuit including said capturing means; means for circulating air in said circuit; means for heating said air to increase the volatility of the rind oils captured by said capturing means; and a condensing means in said air circuit means for condensing the captured rind oil vapors.

In testimony whereof, I have hereunto set my hand at Los Angeles, California, this 16th day of Oct. 1925.

HASTINGS M. SHIELDS.